United States Patent [19]
Smith et al.

[11] Patent Number: 6,064,973
[45] Date of Patent: May 16, 2000

[54] CONTEXT MANAGER AND METHOD FOR A VIRTUAL SALES AND SERVICE CENTER

[75] Inventors: Jim Smith, Charlotte, N.C.; Jim Adamczyk, Chicago, Ill.; John Pesavento, Charlotte, N.C.

[73] Assignee: Andersen Consulting LLP, Chicago, Ill.

[21] Appl. No.: 09/062,492

[22] Filed: Apr. 17, 1998

[51] Int. Cl.[7] .............................. G06F 15/21; H04M 1/69
[52] U.S. Cl. ...................... 705/7; 705/8; 705/9; 379/220
[58] Field of Search .................. 705/7, 8, 9, 11, 705/26; 379/220

[56] References Cited

U.S. PATENT DOCUMENTS

| | | | |
|---|---|---|---|
| 4,289,934 | 9/1981 | Pitroda et al. | 379/269 |
| 4,466,098 | 8/1984 | Southard | 714/12 |
| 4,674,036 | 6/1987 | Conforti | 709/400 |
| 4,700,381 | 10/1987 | Eher | 379/279 |
| 4,737,983 | 4/1988 | Frauenthal et al. | 379/221 |
| 4,755,995 | 7/1988 | Anderson et al. | 714/31 |
| 4,866,763 | 9/1989 | Cooper et al. | 379/221 |
| 4,881,261 | 11/1989 | Oliphant et al. | 379/215 |
| 4,951,310 | 8/1990 | Honda et al. | 379/266 |
| 4,988,209 | 1/1991 | Davidson et al. | 370/270 |
| 5,023,868 | 6/1991 | Davidson et al. | 370/270 |
| 5,031,211 | 7/1991 | Nagai et al. | 379/221 |
| 5,036,535 | 7/1991 | Gechter et al. | 379/210 |
| 5,062,103 | 10/1991 | Davidson et al. | 370/270 |
| 5,073,890 | 12/1991 | Danielsen | 370/270 |
| 5,113,430 | 5/1992 | Richardson, Jr. et al. | 379/88 |
| 5,153,909 | 10/1992 | Beckle et al. | 379/265 |
| 5,175,866 | 12/1992 | Childress et al. | 455/8 |
| 5,185,780 | 2/1993 | Leggett | 379/34 |
| 5,193,110 | 3/1993 | Jones et al. | 379/93.14 |
| 5,214,688 | 5/1993 | Szlam et al. | 379/67 |
| 5,247,569 | 9/1993 | Cave | 379/113 |
| 5,271,058 | 12/1993 | Andrews et al. | 379/210 |
| 5,291,492 | 3/1994 | Andrews et al. | 370/259 |
| 5,291,550 | 3/1994 | Levy et al. | 379/242 |
| 5,291,551 | 3/1994 | Conn et al. | 379/265 |
| 5,299,259 | 3/1994 | Otto | 379/221 |
| 5,309,505 | 5/1994 | Szlam et al. | 379/88 |
| 5,309,513 | 5/1994 | Rose | 379/265 |
| 5,317,627 | 5/1994 | Richardson, Jr. et al. | 379/88 |
| 5,325,292 | 6/1994 | Crockett | 705/9 |
| 5,335,268 | 8/1994 | Kelly, Jr. et al. | 379/112 |
| 5,335,269 | 8/1994 | Steinlicht | 379/266 |
| 5,341,374 | 8/1994 | Lewen et al. | 370/450 |
| 5,353,339 | 10/1994 | Scobee | 379/207 |
| 5,355,403 | 10/1994 | Richardson, Jr. et al. | 379/88 |
| 5,392,345 | 2/1995 | Otto | 379/265 |
| 5,392,346 | 2/1995 | Hassler et al. | 379/265 |
| 5,402,474 | 3/1995 | Miller et al. | 379/93.12 |
| 5,404,350 | 4/1995 | DeVito et al. | 370/217 |
| 5,450,482 | 9/1995 | Chen et al. | 379/207 |
| 5,452,350 | 9/1995 | Reynolds et al. | 379/220 |
| 5,459,780 | 10/1995 | Sand | 379/265 |
| 5,467,268 | 11/1995 | Sisley et al. | 705/9 |
| 5,467,391 | 11/1995 | Donaghue, Jr. et al. | 379/265 |
| 5,546,452 | 8/1996 | Andrews et al. | 379/219 |
| 5,555,299 | 9/1996 | Maloney et al. | 379/212 |
| 5,559,877 | 9/1996 | Ash et al. | 379/221 |
| 5,590,188 | 12/1996 | Crockett | 379/225 |
| 5,590,269 | 12/1996 | Kruse et al. | 705/9 |
| 5,594,791 | 1/1997 | Szlam et al. | 379/265 |
| 5,684,870 | 11/1997 | Maloney et al. | 379/212 |
| 5,717,747 | 2/1998 | Boyle, III et al. | 379/201 |
| 5,721,913 | 2/1998 | Ackroff et al. | 707/103 |
| 5,737,728 | 4/1998 | Sisley et al. | 705/8 |
| 5,768,360 | 6/1998 | Reynolds et al. | 379/220 |
| 5,878,215 | 3/1999 | Kling et al. | 709/207 |
| 5,903,877 | 5/1999 | Berkowitz et al. | 705/26 |
| 5,923,879 | 7/1999 | Sasmazel et al. | 395/705 |

*Primary Examiner*—Allen MacDonald
*Assistant Examiner*—Jagdish Patel
*Attorney, Agent, or Firm*—Merchant & Gould P.C.

[57] ABSTRACT

A context manager for providing a framework for enabling continuous customer access resource innovation by maximizing open business processes. The context manager allows multiple combinations of users to access various business processes through multiple types of customer access resources. The context manager includes a context manager management interface for creating a context manager object for a session, the context manager object providing a bridge from customer access resources to business processes and maintaining a context of the session across customer access resources.

34 Claims, 11 Drawing Sheets

CONTEXT MANAGER AND METHOD FOR A VIRTUAL SALES AND SERVICE CENTER

CROSS-REFERENCE TO RELATED APPLICATIONS

This application is related to:

application Ser. No. 09/062,151, entitled "A Virtual Customer Sales and Service Center And Method," filed on same date herewith by Charles McDonough et al., and assigned to the assignee of this application;

application Ser. No. 09/062,335 entitled "A Rule Based Routing System And Method For A Virtual Sales and Service Center," filed on same date herewith by Bryan Bonting et al., and assigned to the assignee of this application; and application Ser. No. 09/06/999, entitled "Quality Center and Method For A Virtual Sales and Service Center," filed on same date herewith by Charles McDonough et al., and assigned to the assignee of this application.

All of the above-identified applications are incorporated by reference herein.

BACKGROUND OF THE INVENTION

1. Field of the Invention

This invention relates in general to a virtual Sales and Service center, and more particularly to a method and apparatus for connecting a customer to any type of sales and service resource through any access method at any time from any customer location.

2. Description of Related Art

In the United States, telecommunications is an industry that is undergoing convergence. There is a good deal of discussion about the consolidation of computing and telecommunications into one overarching entity. There is also lot of talk about one wire to the home and one even larger wire or cable to the business.

The trend toward universal data access has brought the focus of two technologies to the solution of a single problem, i.e., integrating telephones and computers to provide access and control of the data residing on both platforms. Computer telephone integration (CTI) is a technology platform that merges voice and data services at the functional level to add tangible benefits to business applications. CTI technology combines voice and data to form a foundation to support business applications, seamlessly combining functions from both the telephony world and the computing world.

Over the years, telecommunications and data technologies have grown more alike. The independent features offered by telephones and computers become even more powerful, useful, and convenient when combined into voice processing applications running on computers. In today's business environment, the telephone is often the primary means of communication in many different situations: placing catalog orders, checking airline schedules, querying prices, reviewing account balances, and recording and retrieving messages. Usually, each telephone call involves a service representative talking to a caller, asking questions, entering responses into a computer, and reading information to the caller from a terminal screen.

When organizations automate this process by linking their computer and telephone systems, they can lower costs, provide better customer service, increase the number of services available, and extend hours of operation. CTI lets customers, for example, use their touch-tone phone to check their bank balance 24 hours a day rather than walk to a cash machine or wait on hold for a customer service representative. And the marriage of phone and computer systems can identify incoming calls, route them to the appropriate person, and deliver the caller's file on a computer screen to the person answering the call—before the call is answered. Accordingly, the road to greater profit runs through a call center for high quality, low-cost customer acquisition and retention.

Today's computer-telephone integration offerings enhance a range of emerging technologies, such as:

Interactive voice response: the ability to input and retrieve information from a computer database via a touch-tone phone;

Fax publishing: the ability to request that fax information be automatically forwarded to the caller via touch-tone phone;

Two-way message notification: the ability to link voice mail and electronic mail (E-mail) systems so that users can collect all messages—voice and data—via a single source CTI provides many benefit to consumers. For example, CTI allows consumers to spend less time on hold, improves response time for callers once they get through to the company, allows instant access to database information, often on a 24-hour basis; provides callback options for callers who don't want to stay on hold, provides access to service reps who, when freed from routine functions, have more time to research and answer complicated questions, and eliminates the need to repeat identification information and reason for calling when transferred to another employee or department.

Businesses also benefit from the use of CTI. For example, the benefits of CTI to business includes prompter and more accurate response to inquiries, orders, and service requests, personalized attention and efficient problem resolution, improved customer and prospects access to information about new products and services, increased number of services available and extended hours of operation Increased telesales revenue, higher levels of referral and repeat business, fewer data entry keystroke errors, shorter transaction time, increased employee productivity, improved employee morale, and cost savings from operational efficiency.

Today, the majority of CTI applications are being built for call centers. A call center is a customer business center where initial access is by telephone. Employees working in call centers provide services over the telephone. Their tasks can include placing outgoing calls, answering incoming calls, asking callers for information, or providing services. While handling calls, employees often use desktop computers to enter or retrieve information.

Current call center routing techniques can be difficult to manage and do not simplify the interaction for customers. Routing services within a call center have traditionally been provided through caller initiated functions such as selecting one of several 800 numbers or making a particular selection in the Voice Response Unit (VRU). The routing services do not provide for an effective match of skilled employees with customer value and need. Multi-site call center routing is typically a simple percentage allocation of calls to various sites achieved through the network carrier. Overflow services are managed through the are-assignment of employees to queues. The goal in all these methods is to provide some level of improved service to the customer through a better match of calls to skilled employees and a better use of available employees. These approaches require many different mechanisms to provide call routing. These mechanisms include: various 800 numbers, network carrier load balancing, VRU routing to queues and static realignment of employees to queues.

The typical CTI call center makes use of products and services from several different sources: public and private networks; voice switches, automatic call distributors, hardware and software from computer vendors, specialized business applications from software suppliers, and components such as voice response units, voice mail systems, call sequencers, predictive dialers, and fax machines.

However, prior call center systems do not provide a framework to enable continuous channel innovation by maximizing open business processes. Further, prior call center systems lacked the capability to manage multiple customer access resources spanning a large-scale distributed business solution. As a result, business process have not been effectively used across multiple channels. Multiple customer access resources have not been bridged to underlying business processes.

It can be seen that there is a need for a virtual customer sales and service center which connects any customer to any resource through any access method at any time from any customer location.

It can also be seen that there is a need for a common technology platform which support all forms of customer interaction including customer self sales and service as well as employee assisted sales and service.

It can also be seen that there is a need for a framework to enable continuous channel innovation by maximizing open business processes.

It can also be seen that there is a need for a managing multiple combinations of users needing access to business processes through multiple types of delivery channels.

SUMMARY OF THE INVENTION

To overcome the limitations in the prior art described above, and to overcome other limitations that will become apparent upon reading and understanding the present specification, the present invention discloses a context manager for providing a framework for enabling continuous channel innovation by maximizing open business processes.

The present invention solves the above-described problems by providing a manager for allowing multiple combinations of users to access various business processes through multiple types of customer access resources.

A system in accordance with the principles of the present invention includes a context manager management interface for creating a context manager object for a session, the context manager object providing a bridge from customer access resources to business processes and maintaining a context of the session across customer access resources.

Other embodiments of a system in accordance with the principles of the invention may include alternative or optional additional aspects. One such aspect of the present invention is that the context manager management interface further comprises an information manager for managing information required during the session.

Another aspect of the present invention is that an access coordinator is provided for coordinating access by a customer access resource to a business process, and wherein the context manager management interface provides a context for completing the business process for the session.

Another aspect of the present invention is that a component integration architecture is provided, wherein a component comprises a reusable software module presenting an interface that conforms to an object model of a context manager object or a business object, the component being enabled and accessed at runtime through the component integration architecture.

Another aspect of the present invention is that the context manager management interface keeps track of the contact manager object, customer objects, account objects, contextual information and session information.

Another aspect of the present invention is that the context manager management interface manages the session objects for each of the customer access resources Another aspect of the present invention is that the customer access resources comprise customer service representative applications, Internet/PC applications, and kiosk applications.

Still another aspect of the present invention is that an interface is provided for interfacing the business processes to the customer access resources.

Another aspect of the present invention is that the business processes represent high level abstractions of multiple components/objects collaborating to deliver the requested response.

Another aspect of the present invention is that a component interface is provided for presenting business processes to customer access resources, the customer access resources selecting business processes therefrom.

Another aspect of the present invention is that the context manager management interface destroys context manager objects when a session ends.

Another aspect of the present invention is that each context manager object maintains sets of relationships to all of the business objects that represent the context for a given session.

Another aspect of the present invention is that the sets of relationships that the context manager maintains during a given session is dependent on the business processes the particular session is using.

Yet another aspect of the present invention is that the context of a session is shared among customer access resources by sharing context manager objects.

Another aspect of the present invention is that customer access resources can access the same context manager object to perform simultaneous, concurrent functions.

Another aspect of the present invention is that a transaction manager is provided for preserving object integrity of the session by controlling access to the business activities.

Another aspect of the present invention is that the transaction manager logically groups business activities into a business unit of work, a business unit of work involving a state change to one or more of the business objects that comprise the business activities.

Another aspect of the present invention is that the context manager management interface ensures uniform handling of the business units of work that are defined by the business functions across the customer access resources.

Another aspect of the inventions is that multiple context manager management interfaces can be run simultaneously to provide performance, scalability and fault tolerance and any customer access resource can access any context manager management interface.

Another aspect of the invention is that context manager management interfaces can be grouped into modules and any number of modules can be deployed, providing massive scalability. Any customer access resource involved in a customer contact session can access the context manager management interface controlling that session regardless of what module the object manger resides within.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention is a Virtual Sales and Service Center that provides connection of customers to any type of sales and service resource through any access method at any time from any customer location.

Figure 1:
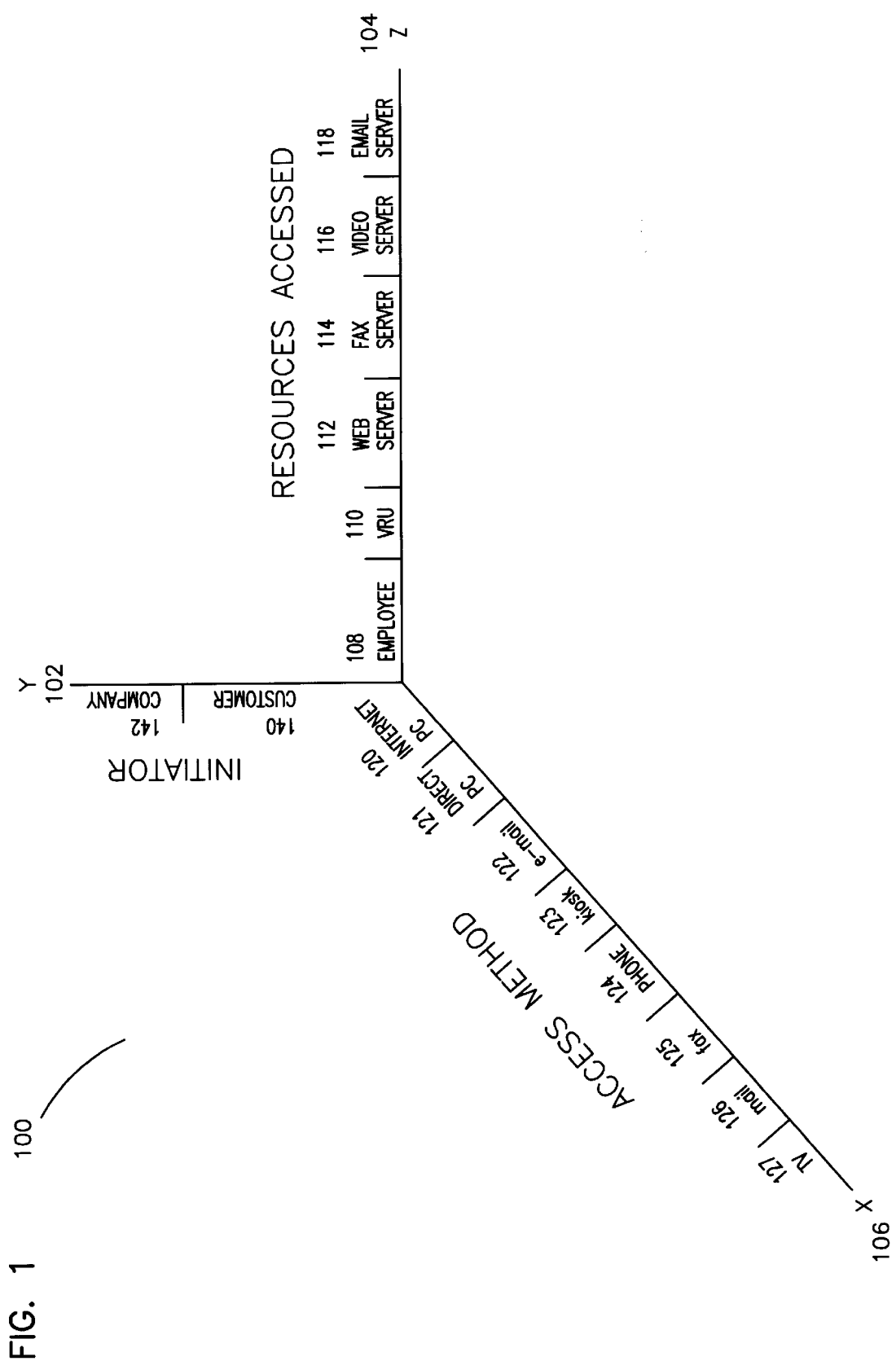
FIG. 1 illustrates a three dimensional representation of the Virtual Sales and Service Center access logistics.

FIG. 1 illustrates a three dimensional representation of the Virtual Sales and Service Center access logistics 100. In FIG. 1, the y axis 102 represents the contact initiator. A customer contact may either be initiated by the customer 140 or by the company 142.

The x axis 106 represents access method of the customer. Customers may access the Virtual Sales and Service Center from a wide variety of locations using a variety of methods. For example, a customer may access a company through the Internet 120. A customer may access a web page to retrieve customer or company information. The information at the web page may be unsecured information concerning a company's services and/or products. Alternatively, a customer may access secured, personal or private information via encryption, authentication and other digital security measures. Those skilled in the art will recognize that the invention is not limited to a particular instrumentality however.

Other customer access methods may include direct pc access 121, e-mail 122, kiosk 123, phone 124, fax 125, mail 126, tv 127 etc. Those skilled in the art will recognize that the type of customer access method is not meant to be limited to the particular examples outlined herein. The invention provides the interface with any type of customer hardware and access method.

The z axis 104 represents the resources accessed during the contact with the company. The types of resources accessed may include an employee 108. Employees 108 may be in thousands of locations ranging from large call centers with hundreds of persons to small offices or branches with a single person. The skills of employees may vary tremendously including product knowledge, language, sales ability, knowledge of specific customers, etc. As a result, the logistics associated with effectively matching customer contacts are particularly challenging and the benefits are particularly high.

Other resources accessed by customers include the VRU 110, web server 112, fax server 114, video server 116, e-mail server 118, etc. Those skilled in the art will recognize that the type of resource is not meant to be limited to the particular examples outlined herein. The invention provides the interface with any type of resource existing within the company.

Figure 2:
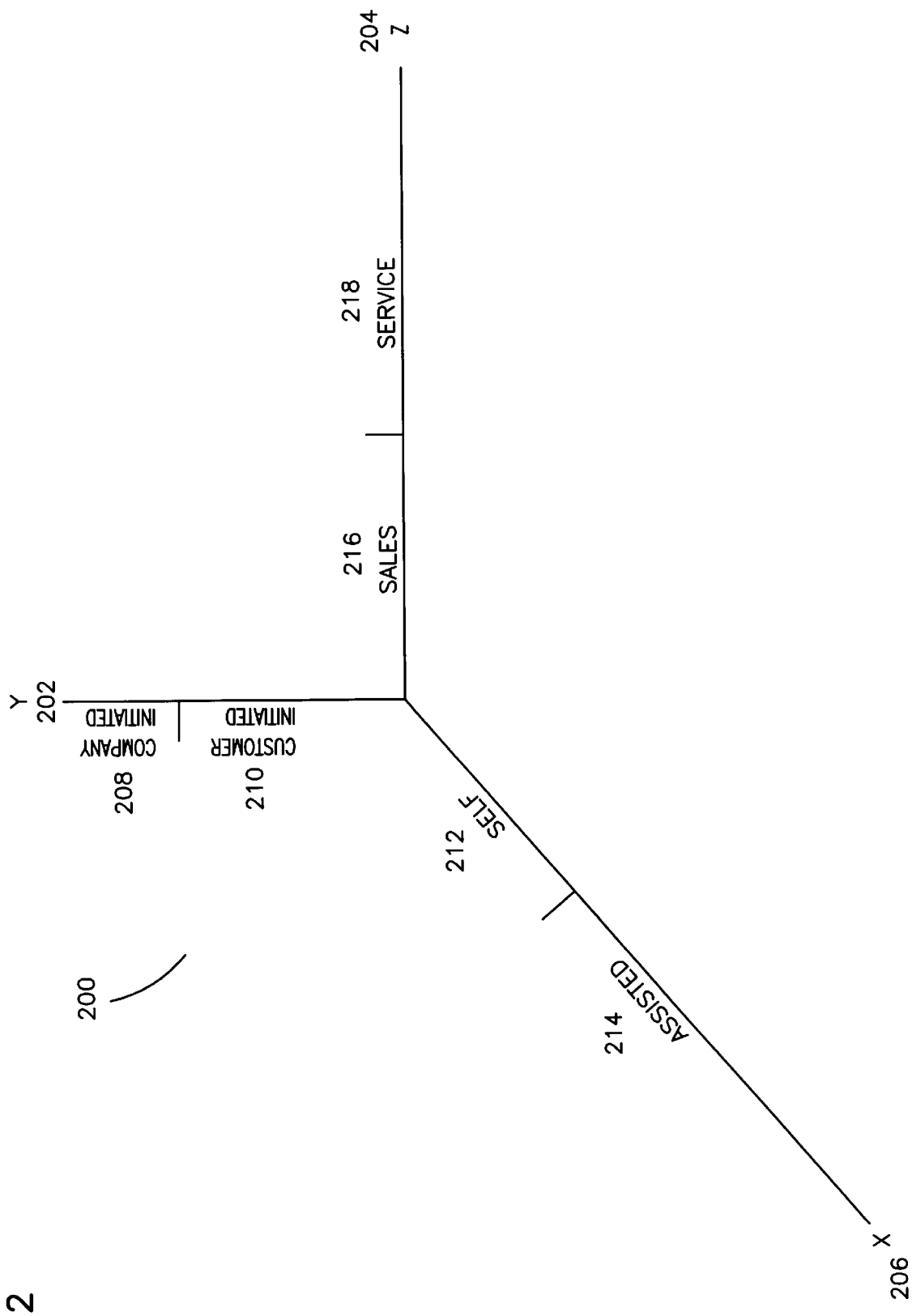
FIG. 2 illustrates the range of customer interactions included with in the scope of the invention.

FIG. 2 illustrates the types of customer interaction 200 included in the scope of this invention.

The y axis 202 represents the initiator. A customer contact may either be initiated by the customer 210 or by the company 208.

The z axis 204 represents the customer purpose. The overall purpose may be sales 216 or service 218.

The x axis 206 represents the interaction style. The interaction style may be self-assisted 212 or assisted 212.

The invention includes the routing and customer-resource matching algorithms to effectively handle any interaction style within the framework shown in FIG. 2

Figure 3:
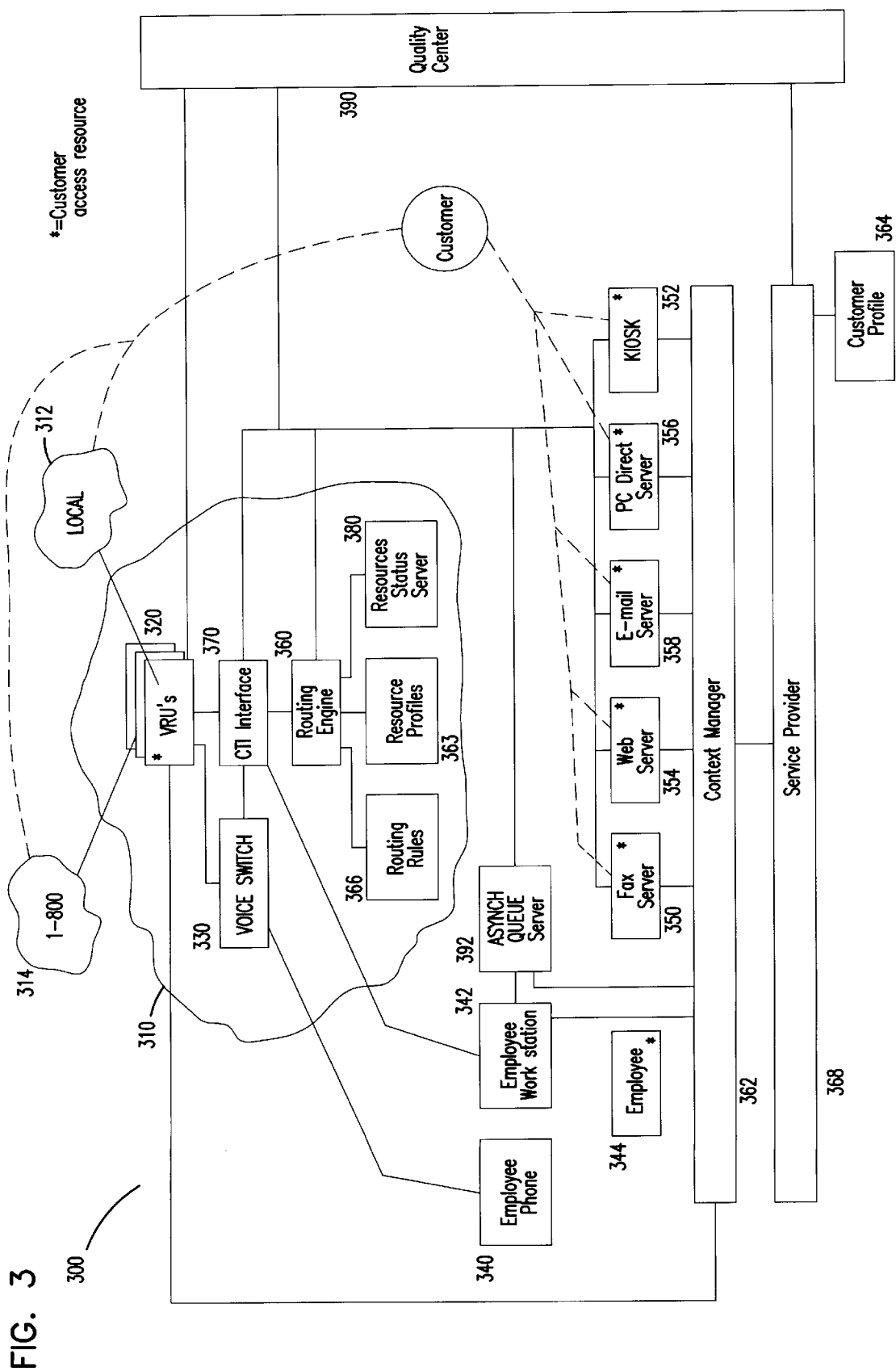
FIG. 3 illustrates a functional diagram of the Virtual Sales and Service Center according to the present invention.

FIG. 3 illustrates a functional diagram of the Virtual Sales and Service Center 300 according to the present invention. Depending on the customer's access method, a number of different resources may accept the initial contact with the customer.

In many companies, the phone is a high volume access method. In the invention a cloud 310 is established to source calls to the Virtual Sales and Service Center 300. All calls, including local numbers 312 and 1-800 numbers 314, are delivered to this cloud 310. Within the cloud 310 are Voice Response Units (VRUs) 320 which play a script that is heard by incoming customers placing calls to the Virtual Sales and Service Center 300. The script played by the VRUs 320 enables a customer profile to be identified. The content of the script is then personalized for each customer, including matching the language being spoken by the caller. The VRUs 320 offer a convenient navigation interface and can both meet customer requests directly or initiate navigation to a resource that can handle the customer request. The VRUs 320 can also execute some cross-sell activities.

Should it be determined that a call needs to be directed to a company employee or other resource, the VRUs interact with the routing engine 360 through the CTI interface 370 to initiate the transfer. The routing engine 360 accesses ANI and DNIS information, customer profile information 364, VRU activity thus far, the routing rules 366, resource profiles 363, and the resource status server 380 to select an available resource based on the customer's expressed or implied need.

ANI is a service offered by telephone networks that provides the billing directory number associated with a calling party. When a customer calls an 800 number to order from a catalog, the call arrives at the call center with the caller's telephone number. The telephone number is passed to a CTI server 370. Organizations that maintain multiple 800 numbers can also use Dialed Number Identification Services (DNIS) offered by carriers to identify what the caller wishes to discuss. A bank, for example, can assign 800-555-1333 to VISA cards and 800-555-1334 to VISA Gold cards.

The Virtual Sales and Service Center 300 according to the present invention may combine the use of ANI and DNIS with the other information available to it. Furthermore, CTI systems 370 using ANI make it possible for companies to capture information about abandoned calls. If a customer hangs up while waiting for any type of sales and service resource, employees can pro-actively call back customers and offer to be of assistance.

Routing rules 366 are not based on a single queue or gate (e.g. Service) but can be governed by which resource skills can most accurately address the request. Once any type of sales and service resource has obtained a new skill or improved on an existing skill, it becomes a simple task of updating that skills profile 364. Similarly, if additional customer information needs to be included in the routing rules 366, the customer profile 364 is updated to include the routing criteria. Overflow rules within the routing rules 366 are also automated to allow for increased call center management.

Upon obtaining all relevant available requirements information the routing application 360 will access the resource profiles 363 to find resources with the appropriate skills. This resulting set of resources will be used when accessing a statistics server 380 to determine which resources are currently available for the contact. The statistics server 380 provides a real time status of each of the resources' availability. A specific resource will then be selected based on resource availability, skill profiles, and load balancing. If the statistics server 380 indicates that the optimal resource is not available, the routing engine 360 will check its routing rules 366 for overflow processing.

If the overflow resources are available, the call and associated data will be routed to those resources. If the original destination resource and the first overflow resources are not available, the call will be routed to another resource based upon the routing rules.

The routing engine 360 then notifies the VRU 320 with the appropriate call treatment and routing authorization once a resource is selected. The VRUs 320 then send the call to the switch 330 which interacts with the CTI interface 370 to determine the appropriate employee 344 and phone 340. The CTI interface 370 also interacts with the workstation 343 associated with the phone 344 and ensures a screen pop, which provides the employee with the key information such as the customer identity, their need and the presence of a cross-sell opportunity, is delivered at the same time as the actual customer phone call is delivered to the phone 340 by the switch 330.

Contacts may also arrive at a web server 354, a home PC direct connection server 356, a kiosk 353, an e-mail server 358 or a fax server 350.

In all cases, every customer contact is immediately logged with the context manager 362. The Context Manager 350 manages the complexity of dealing with multiple customer interaction devices which must share common business processes. These business processes are distributed across many underlying, heterogeneous systems. The Context manager 362 provides for the management of information which is required over the life of a business event. The Context Manager 350 coordinates access to the appropriate Service Providers 368 and provides the Service Provider 368 the context to complete the business transaction.

As a contact progresses, the VRU 320, the employee workstation 343, the web server 354, the kiosk 353, the fax server 350, the e-mail server 358 and the PC direct server 356 continually interact with the context manager 362.

Contacts may be transferred between resources many times during the course of a call and this transfer activity is coordinated by the context manger 363 and the routing engine 360.

If the contact is asynchronous or if there is work which was initiated but not completed during the course of a synchronous contact, resources may request that the context manager 362 place a request with an asynchronous queue server 392. The routing engine 360 will coordinate the subsequent matching of that request with an available resource which will most often be an employee 344, but may be other resource types.

The Virtual Sales and Service Center 300 uses a suite of products to enable intelligent contact routing in a network cloud, including customer profiles 364, employee skills profiles 363, VRU options 320, availability of employees 340, and overflow management within the routing rules 366. In the preferred embodiment, Genesys computer telephony processing components 360 370 380 provides optimized and flexible solutions to transform the operations from simple interactions between phone calls and voice switch queues into sophisticated high value information exchanges that accomplish real-time matching of customer contacts through any access method with the appropriate resources.

All components in FIG. 3 communicate via LAN-based TCP/IP messaging. This open, distributed architecture provides a scaleable and adaptable solution.

Figure 4:
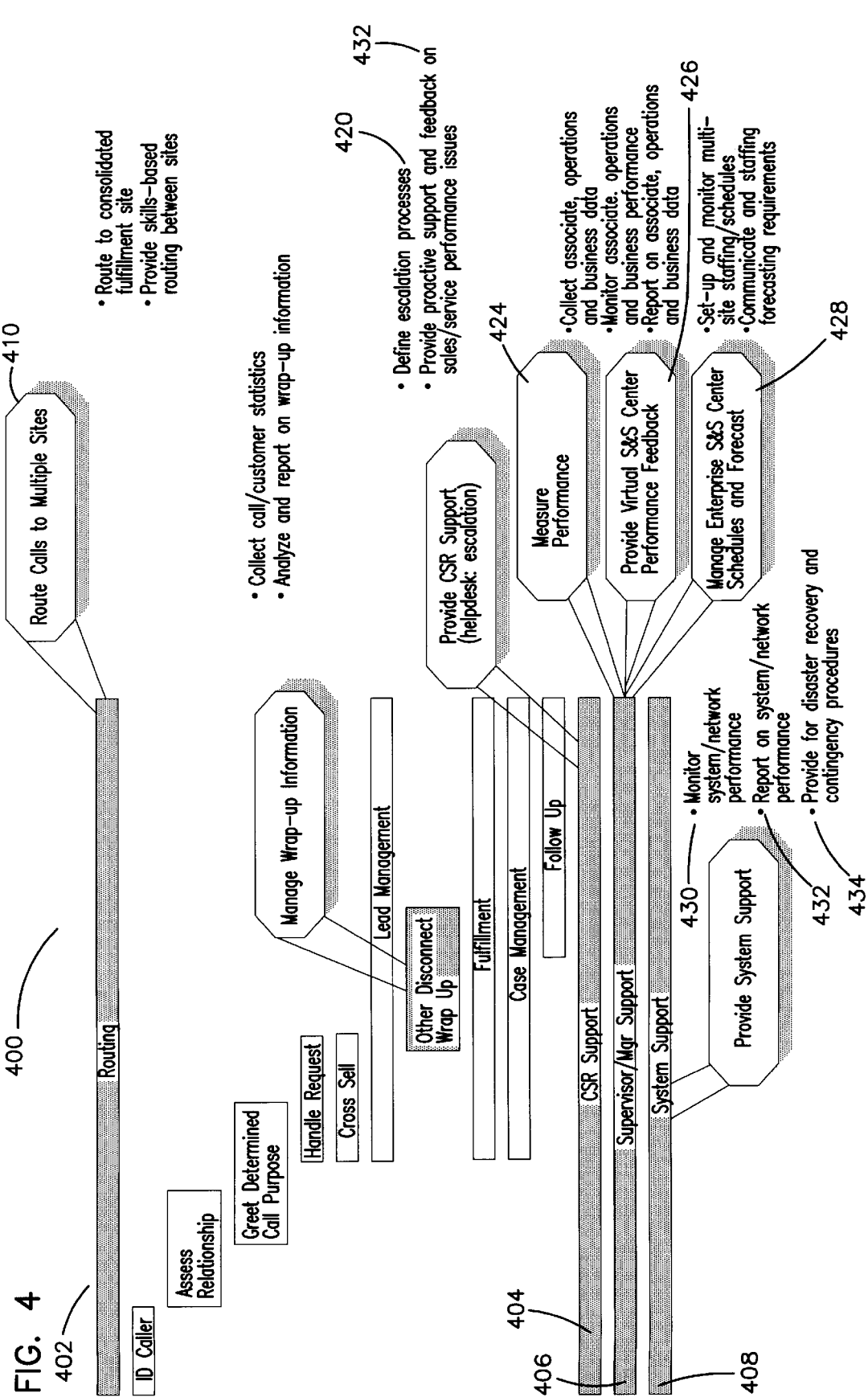
FIG. 4 is an outline of the business processes for operating and supporting a multi-site, virtual sales and service center.

FIG. 4 is an outline 400 of the business processes for operating and supporting a multi-site, virtual call center.

The business processes 400 illustrated in FIG. 4 include routing 402, customer service support 404, supervisor/management support 406 and system support 408. The routing processes 402 are supervised and modified as necessary by the Quality Center. For example, the Quality Center may adjust the routing rules in cases of inclement weather forcing the shutdown of a particular location by routing calls to multiple sites 410.

The Quality Center will provide customer service support 404 by defining escalation processes 420 and providing proactive support and feedback on sales/service performance issues 422. The Quality Center will also measure the performance of the Virtual Sales and Service Center 424, provide performance feedback 426 and manage the staffing, schedule and forecasting 428 for the Virtual Sales and Service Center 300. System support 408 will be provided by the Quality Center in the form of monitoring of 430 and reporting on 432 the system performance, and providing disaster recover and contingency procedures 434.

According to the present invention, the routing rules are the step-by-step instructions which combine the routing components to identify what resource will receive a particular contact. Skills based routing methodology uses the skills and experience of each resource. The skills and experience of each resource is then matched against the requirements and characteristics of a particular contact to assign any type of sales and service resource to the contact. Contacts can be assigned to any resource that has the skills required for the contact. Similarly, overflow can be to any resource with the required skills. Intelligent rule based routing according to the present invention provides several advantages to a Virtual Sales and Service Center. First, rule based routing reduces customer confusion with few/one access numbers for all of a company's products. Service is improved by getting the customer to the right resource the first time thereby reducing transfers. Rule based routing provides distinctive service levels based on a customers relationship.

Further, rule based routing can capitalize on "moment in time" relationship expansion opportunities by routing identified calls to skilled cross-sell and sales employees and can route callers to appropriate specialized employees based on callers request.

The efficiency of all sales and service resources is improved by balancing contacts across the enterprise resource pool and management of these resources may be more automated through routing rules designed to automatically handle overflow situations. This means that fewer resources, particularly expensive human resources, are required to handle peak contact volumes while maintaining the desired customer experience.

In addition, rule based routing allows positioning for mass customization of contacts based on customer indicated preferences.

To remain competitive, businesses must retain their most profitable customers and pro-actively increase customer profitability. According to the present invention, implement this strategy by segmenting customers and allocating resource levels to each to so as to deliver the desired customer experience. For example, calls from the most profitable customers would be answered by a business's most skilled and experienced employees while calls from the least profitable customers can be answered by the least experienced and skilled employees.

Many contacts into the Customer Service Center also offer unique cross-sale opportunities. For example, if a customer is calling to pay off a loan, then the customer may be interested in a new loan. If the customer has only a checking account, then the customer may be a candidate for other services. Customers should be routed to specially trained cross-sale specialists and/or customer interaction technology resources may be directed to issue cross sell messages to the customer when these unique cross-sale opportunities are identified.

To facilitate this objective, Voice Response Units (VRUs) are scripted to identify the type of service the customer desires prior to transferring the call to any type of sales and service resource. This information will then be used to route the customer to a sales and service resource with the appropriate skills for that service. Specific requests for employee extensions can also be provided via a script.

In prior systems, calls are often balanced between centers based on "expected" call arrival and staffing assumptions. However, the percentage of calls allocated to each call center must be manually adjusted when actual arrival rates do not match the "expected" arrival rates. According to the present invention, call routing is automatically balance calls between all locations because all employees in all locations are can be considered during any route request. Further, the present invention automatically routes calls to overflow employees when optimal employees are unavailable.

Businesses need to develop a "relationship" with each customer. However, relationships are best developed when a customer speaks with any type of sales and service resource who is familiar with the customer and his or her needs. Call routing according to the present invention contributes to building customer relationships by routing calls to employees who have previously dealt with the customer. Rule based routing provides the customer the ability to request a specific employee or in the absence of a specific employee request, route the customer to any type of sales and service resource with whom he or she has previously spoken. If that particular employee is not available the customer should be able to request a call back from the employee.

The rule based routing system also provides a framework where additional routing functionality can be easily developed for the Virtual Sales and Service Center. Intelligent routing technology assures that calls are routed to employees with the necessary skills to provide the highest quality of service to the calling customer. This technology utilizes information gathered from the customer profile and seeks to make an appropriate match to that of any type of sales and service resource's profile. Routing decisions are therefore not based on a single queue or gate (e.g. Service) but can be governed by which employee skills can most accurately address the caller's request. Once any type of sales and service resource has obtained a new skill or improved on an existing skill, it becomes a simple task of updating that employee's skills profile. Similarly, if additional customer information needs to be included in the routing decision, the customer profile is updated to include the routing criteria. Overflow rules are also automated to allow for increased call center management.

Accordingly, an intelligent rule based routing system according to the present invention can provide single 800 number access for all products and services; pre-routing between multiple call centers based on availability of particular employee skill sets; skills based routing via employee and customer profile matching; call overflow management based on automated rules and pre-programmed next best routes; improved call management by reduced points of control; service level distinction based on customer value profile once customer is identified; and mass customization of routing based on detailed employee and customer profiles.

Figure 5:
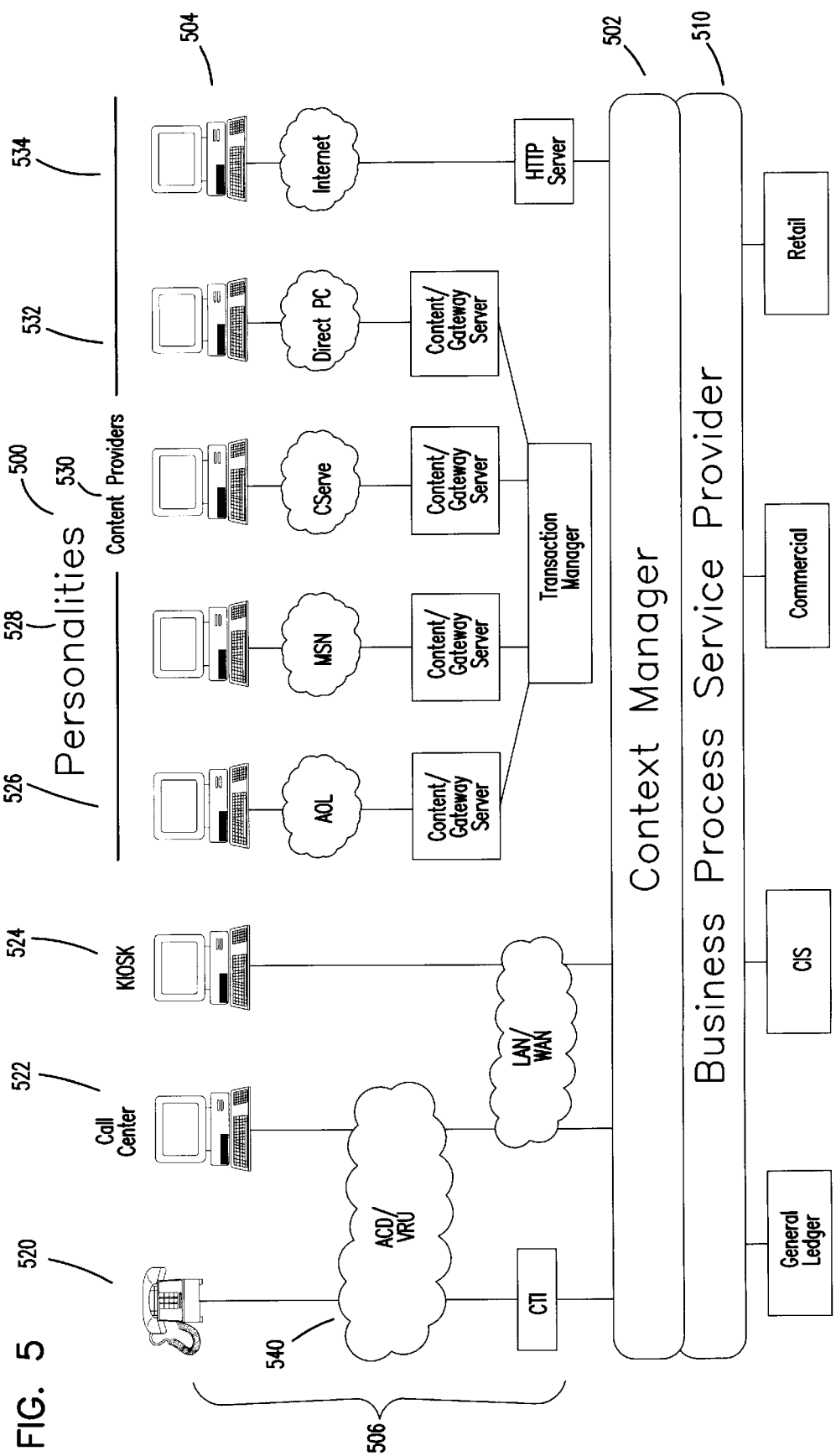
FIG. 5 illustrates a block diagram of a virtual sales and service center having a Context Manager for handling the management of the multiple Customer access resources.

FIG. 5 illustrates an overview 500 of the Context Manager 502. The Context Manager 502 provides management capability for multiple customer access resources 504 which share common business processes that may be distributed across many underlying, heterogeneous systems 506. The Context Manager 502 provides the management of information required over the life of the business event. The Context Manager 502 coordinates access to the appropriate business processes and provides them the context to complete each business unit of work.

The Context Manager 502 provides the interface between the business process Service Provider 510 and the different channels 520–534. Channels are often defined very broadly. As a result, the different specific channel varieties 520–534 must be identified. These channel variants 520–534 are called customer access resources. The term customer access resource is used because the channels not only vary due to their specific purpose, but also vary in their behavior as they personalize the customer experience.

While intelligent routing provides rich functionality, the data it uses to make decisions on call attributes must be processed very fast. Customer profiles, customer accounts, and traditional account data will be accessed by a VRU 540 and customer initiated VRU events will be passed to a Service Provider 510. The Service Provider 510 maintains the business logic in channel independent applets.

The Service Provider 510 applies decision logic to determine the customers needs. The result will be a call routing profile that the intelligent routing engine will use to match against the centrally maintained employee profile. The result will be an intelligent routing rule based on custom call profile and skilled employee availability.

The cloud 540 will pass pertinent routing information collected by the Service Provider from the VRU to Service Provider 510 interaction. The Service Provider 510 will then perform a logical combine of the VRU attributes and the customer profile attributes to determine the true routing attributes of the call. For example, in the context of banking, if a customer performed a loan payoff request in the VRU but did not have a cross-sell indicated on their customer profile, then the routing profile would indicate that a cross-sell was "Yes". This routing information may include tier, product(s), type of service, type of customer banking, language captured from DNIS, and number of transfers indicator.

The present invention emphasizes the use of Component and Object Technology. The Object Management Group's (OMG) Common Object Request Broker Architecture (CORBA) may be used for distributed computing and object messaging. In this manner, product availability, openness and functionality goals can be satisfied.

Multiple customer access resources spanning a large-scale distributed business solution are managed using the Context Manager framework. However, to rewrite business processes or create new "adapters" each time a new access resource becomes popular would not be economically feasible. Accordingly, the Context Manager anticipates a proliferation of direct customer access resources, some which are yet to be realized. Furthermore, the Context Manager addresses the issue of maximizing the reuse of business processes across those resources. Thus, the Context Manager reduces overall implementation cost, improves the time to market and ensures consistent customer experience across customer access resources. Context Manager accomplishes these business requirements by providing a framework that enables continuous channel innovation by maximizing the "openness" of the underlying business processes to create a "plug and play" type of interface. In this way, multiple combinations of users and delivery channels (called Customer access resources) may be created quickly using the best, most current technology and advanced usability characteristics for the specific need. These heterogeneous customer access resources may then be plugged into the Context Manager to utilize it's ability to leverage the existing, underlying business processes.

The ability to manage the complexity of multiple Customer access resources which must share common business processes that may be distributed across many underlying, heterogeneous systems is handled by the Context Manager framework.

Figure 6:
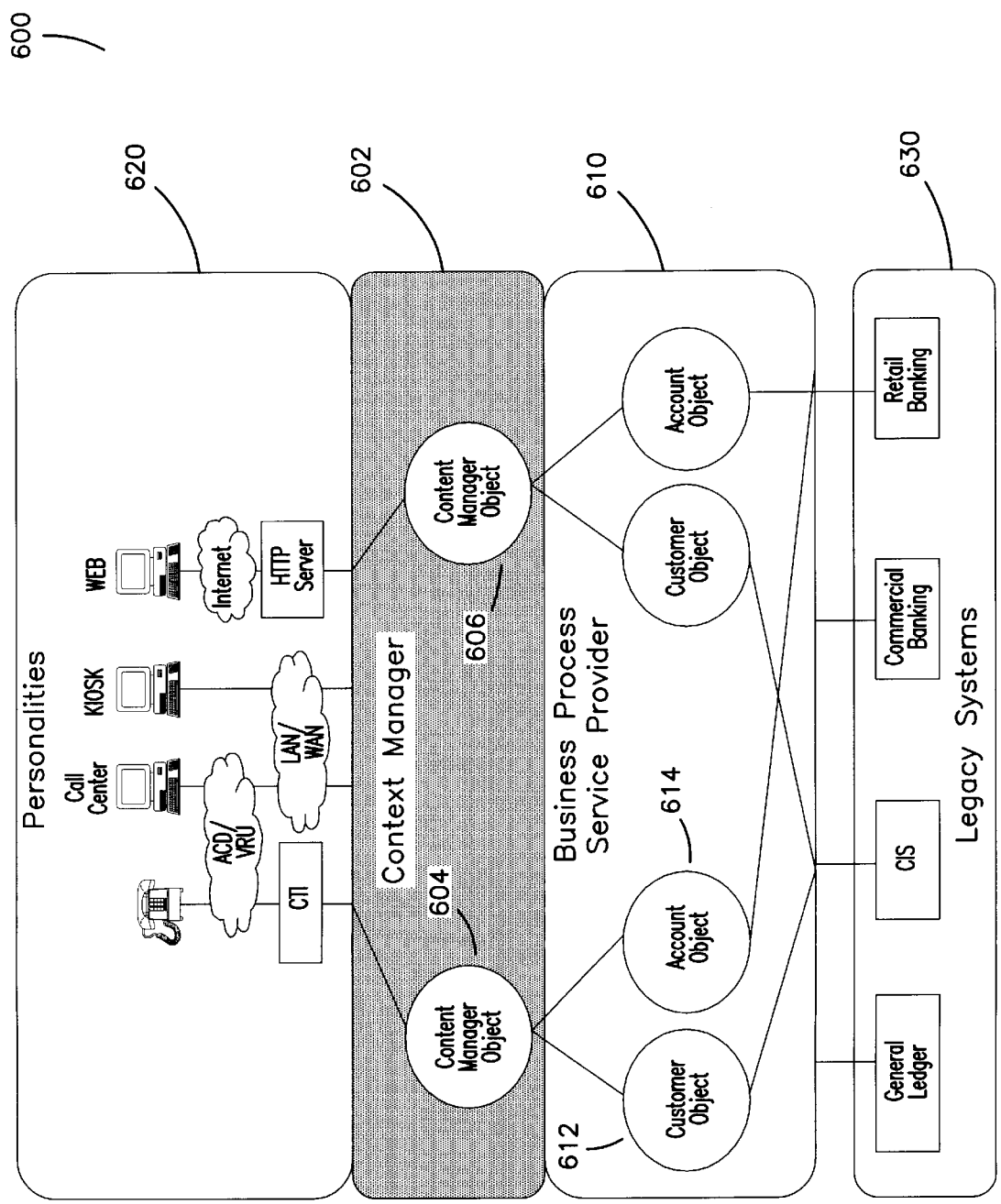
FIG. 6 illustrates a Context Manager in a Retail Direct Banking Call Center.

FIG. 6 illustrates a Context Manager in a Retail Direct Banking virtual sales and service center 600. In FIG. 6, the Context Manager 602 is disposed between the Service Provider 610 and the Customer access resources 620. The business processes represented by a business unit of work 612, 614, for example, are dispersed among several components in the overall solution. These components make up the Service Provider layer of the solution and include business components and infrastructure components. The Context Manager 602 creates a Context Manager object 604, 606 for each session a user experiences with the overall business solution. These objects maintain the context of a session across customer access resources 620 and provide the bridge to the underlying legacy systems 630.

The Context Manager 602 enables the business requirement to maximize reuse across the channels 620 due to the expected proliferation of direct customer access resources 620. The Context Manager 602 does this while reducing overall implementation cost, improving time to market, and ensuring consistent customer experiences across channels. The Context Manager 602 provides the management of information required over the life of the business events 604, 606. The Context Manager 602 coordinates access to the appropriate business processes 612, 614 and provides them the context to complete each business unit of work.

The present invention emphasizes Component and Object Technology. A component is a reusable software module presenting an interface that conforms to an object model and which can be enabled and accessed at runtime through a component integration architecture. The Object Management Group's (OMG) Common Object Request Broker Architecture (CORBA) was selected as the basis for distributed computing and object messaging because of product availability, openness and functionality. Component and Object Technology provides several advantages. For example, components are the best vehicle for reuse. Where appropriate, components built with Object Technology are more reusable, more flexible and are built more productively. Trends also indicate there will be interoperability between the two major approaches to distributed object messaging, i.e., CORBA and Distributed Component Object Models (DCOM).

Another advantage to Component and Object Technology is that there is a convergence between object messaging approaches and the Internet. Object technology is emerging as the best approach for advanced user interfaces and complex business applications which require flexibility and the need to evolve and change over time, while component based solutions allow for integration of "best of breed" components. Further, distributed object based messaging allows for the creation of "customer access resource" independent objects which can respond to messages from a variety of sources (e.g. Internet, call center, Voice Response Unit (VRU), etc.).

Nevertheless, implementing a solution that is powerful enough to leverage a solution's enterprise business processes 612, 614 across multiple customer access resources 620 poses a number of challenges. As mentioned, the business processes 612, 614 represented by a business unit of work are typically dispersed among several components in the overall solution. These components make up the "Service Provider" layer 610 of the solution and include the business components like Account and Customer as well as infrastructure components 612, 614. Without the Context Manager framework, the Customer access resources 620 would have to manage and keep track of all the business processes 612, 614 as well as the objects that support those business processes in order to complete any business unit of work.

As stated above, the Context Manager 602 creates a Context Manager object 604, 606 for each session a user experiences with the overall business solution. These objects 604, 606 maintain the context of a session across channels 620 and provide the bridge to the underlying legacy systems 630. The business processes represented by a business unit of work includes components 612, 614 which constitute the Service Provider layer 610 of the solution. For example, the Service Provider layer 610 includes business components, like customer 612 and account 614 objects, which interface to the Legacy Systems 630.

Accordingly, for each call in the Voice Response Unit (VRU), the Context Manager 602 keeps track of context objects 604, 606, a customer object 612, account objects 614, and any other contextual, or session, information, (i.e. context across customer access resources 620 and transaction management). The Context Manager 602 also manages the session objects for each of the Customer access resources (e.g. Customer Service Representative Desktop applications, Internet/PC Banking applications, and Kiosk applications in retail outlets). Thus, the Context Manager 602 framework removes the management responsibility from the customer access resources 620 and places it on an architectural framework that can be leveraged across Customer access resources 620. Every request from any Customer access resource 620 comes through the Context Manager 602 before it is fulfilled by the Service Provider layer 610. In this way, it acts as an intermediary between the Service Provider Business Processes and the Customer access resource.

As explained above, the Context Manager 602 interfaces the business processes 612, 614 that are available to end users to the Customer access resources 620. Examples of the kinds of banking business processes that can be made available through the Context Manager framework 602 include: Establish session, Verify Customer, Get Accounts, Get Balance, Get Transaction History, end session. These processes represent high level abstractions of multiple components/objects collaborating to deliver the requested response. Still, those skilled in the art will recognize that the applicability of the Context Manager is not meant to be limited to banking processes. The Context Manager may interface any type of business process to multiple customer access resources 620.

In addressing the issue of maximizing the reuse of business processes across those customer access resources 620 by reducing overall implementation cost, improving the time to market and ensuring consistent customer experience across channels, the Context Manager plays several roles. The Context Manager plays several roles in delivering functionality to end users.

Figure 7:
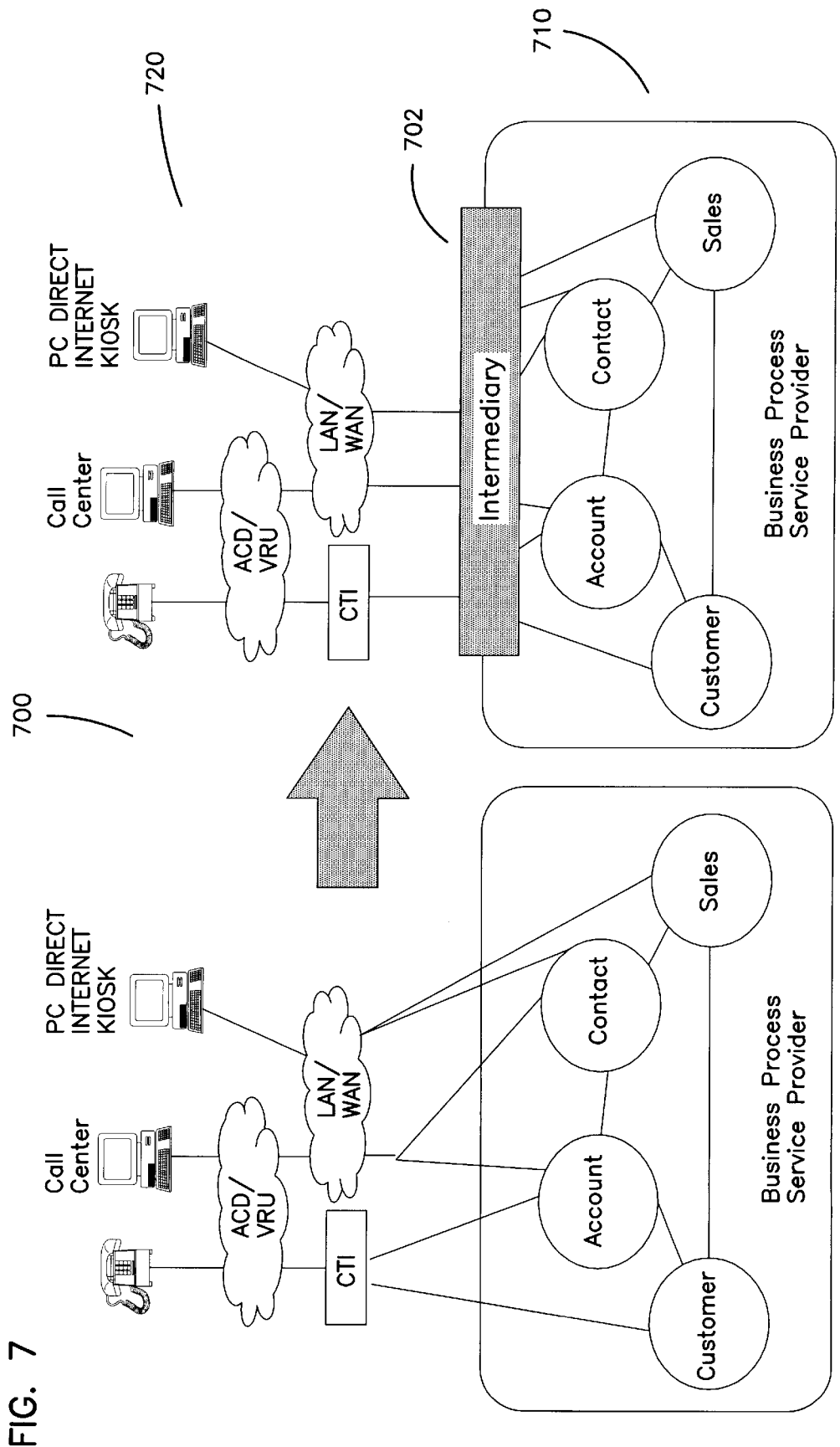
FIG. 7 illustrates the Context Manager functioning as an intermediary between the complexity of the Customer access resources and the underlying Business Process subsystem.

FIG. 7 illustrates an intermediary model 700 where the Context Manager 702 functioning as an intermediary between the complexity of the Customer access resources 720 and the underlying Business Process subsystem 710. The Context Manager 702 essentially wraps multiple objects, and combines the public operations or functions of the underlying objects to provide a single interface. In this way, the Context Manager 702 acts as a bridge to the underlying system 710. Customer access resources 720 can request high-level Business Processes 710 of the Context Manager 702 through its component interface, and the Context Manager 702 relays the request on to the business components 710 that comprise the overall solution.

Figure 8C:
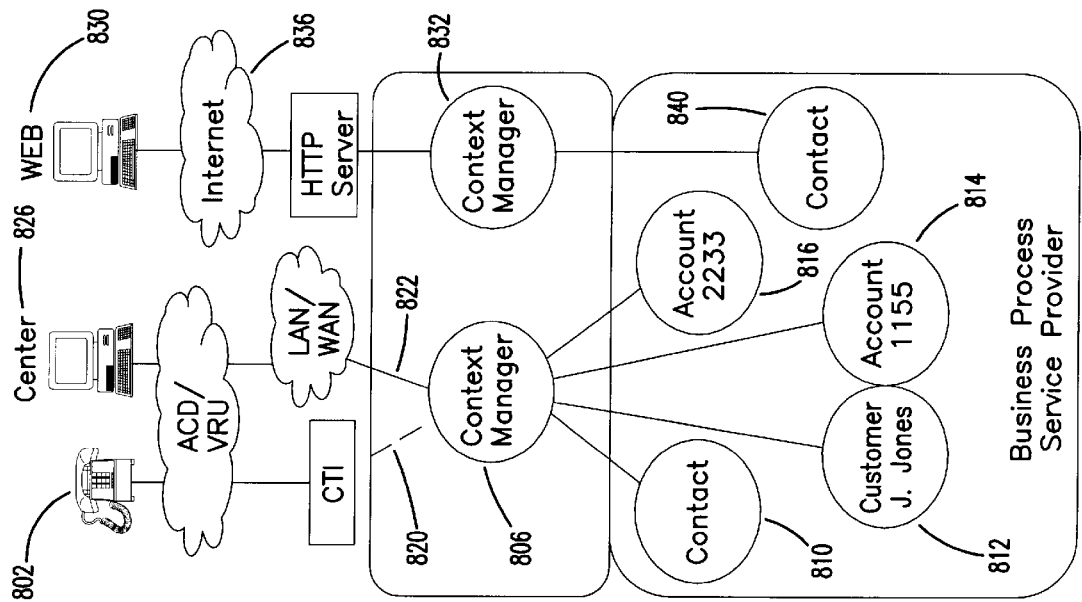
FIGS. 8a–c illustrates the Context Manager performing a second role by keeping track of session information or context of the user experience across Customer access resources.
Figure 8B:
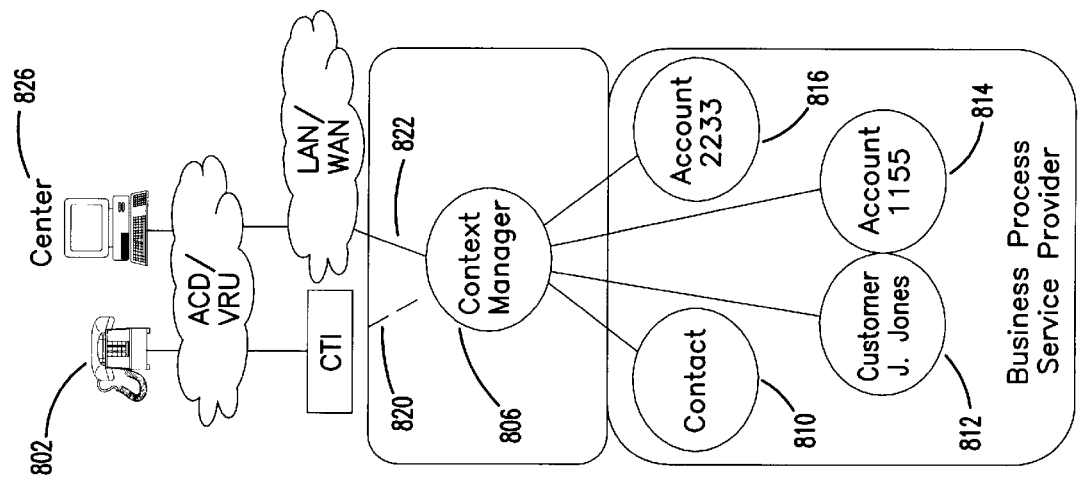
Figure 8A:
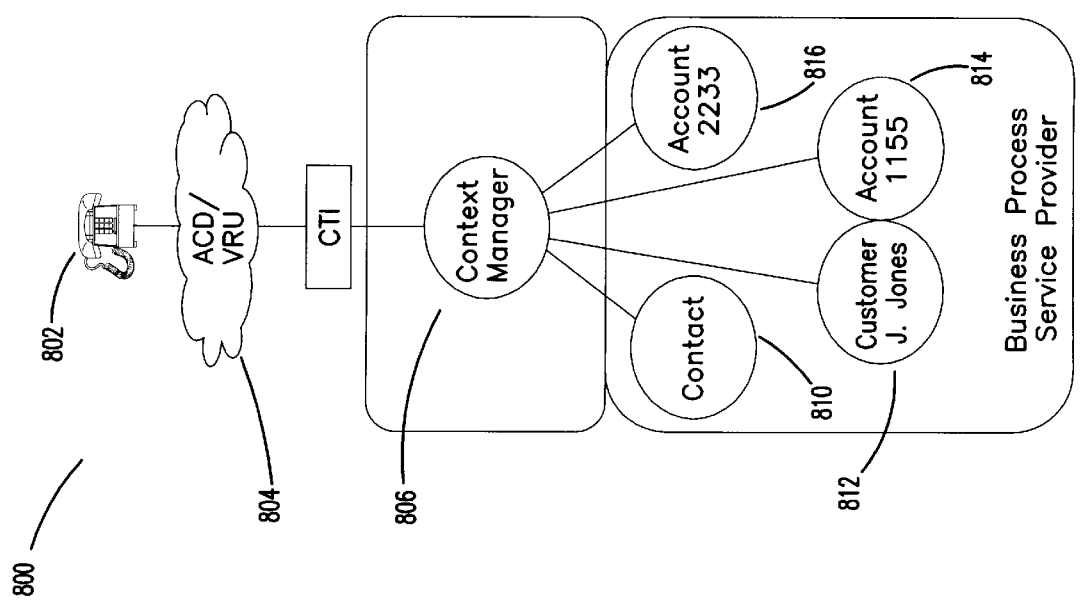

FIGS. 8a–c illustrates the Context Manager performing a second role 800 by keeping track of "session" information or context of the user experience across Customer access resources. The Context Manager creates and destroys Context Manager objects as sessions start and end to manage the business processes. Each Context Manager object maintains a relationship to all of the business objects that represent the context for the given session. The sets of relationships that Context Manager maintains during a given session is dependent on the business processes the particular session is using.

Staying with the banking example in FIG. 8a, a customer 802 calls a bank and establishes a Voice Response Unit (VRU) session 804. This session communicates directly with a Context Manager object 806. During the course of this session, the Context Manager object 806 establishes relationships with several Business Process Service Provider objects: a Contact object 810 representing the user's session, a Customer object 812 representing J. Jones, an Account object 814 representing account #1155, and another Account object 816 representing account #2233. The relationships maintained by this Context Manager object represents the context of this particular session.

FIG. 8b illustrates a user 802 electing to switch from one customer access resource 820 to another 822 during a "session" (for example a user transfers from the VRU to a Call Center Customer Service Representative), the context can be transferred by simply forwarding the reference to the appropriate Context Manager object 806 to the second channel, or Customer access resource 822. This illustrates what happens when the customer 802 transfers from the VRU to a Customer Service Representative (CSR) in the Call Center 826. This transfer occurs by forwarding the reference to the Context Manager object 806 on to the CSR workstation. Since the Context Manager object 806 maintains the context of the session, the context of the call (the Service Provider contact, customer, and account objects) is preserved during the transfer process.

FIG. 8c illustrates the establishment of a new session through one of the Customer access resources 830 by creating a new Context Manager object 832 each time a user requests information. The new Context Manager object 832 represents the session context for that specific interaction. In this case, a second Customer contacts 840 the bank through the Internet 836. A second Context Manager session is established for the Web customer access resource 830 so that each session communicates with its own Context Manager object 832. Thus, the context of one session is isolated from that of other sessions.

Additionally, the context of a session can be shared among several Customer access resources simply by sharing the appropriate Context Manager object 806, 832. Each Customer access resource 802, 826, 830 can access the same Context Manager object to perform simultaneous, concurrent functions. Since the Customer access resources 802, 826, 830 do not maintain any context about the session, there are no issues with respect to data integrity or the misrepresentation of a business object's state.

When dealing with heterogeneous objects distributed across multiple processing servers, transaction integrity is of critical importance. Transaction management is a fundamental piece of context management that guarantees and preserves the data integrity of the objects that comprise the overall solution. The ability to allow a diverse set of objects to participate in any given transaction becomes critically important when dealing with data that spans multiple objects and is stored in multiple places.

Figure 9:
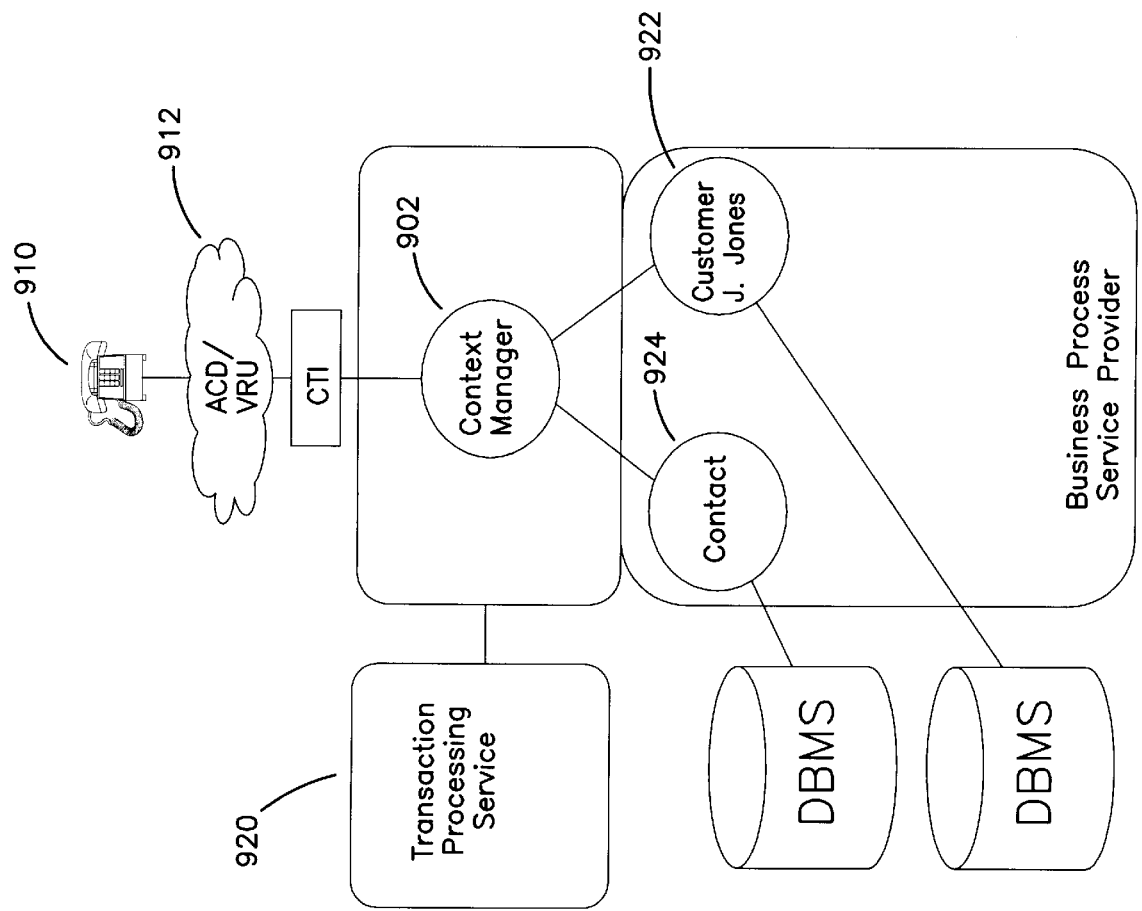
FIG. 9 illustrates the fulfillment of transaction management by the Context Manager.

FIG. 9 illustrates the fulfillment 900 of transaction management by the Context Manager. Context Manager 902 fulfills this role by assuming the responsibility for the initiation and coordination of multiple business activities. The Context Manager 902 logically groups these atomic business activities into a business unit of work. A business unit of work typically involves a state change to one or more of the business objects that comprise the various business activities. The Context Manager 902 ensures that the business units of work that are defined by the business functions are uniformly handled across the range of different Customer access resources.

Again using a banking environment as an example, FIG. 9 illustrates a customer 910 calling a bank and establishing a session through a VRU 912. The customer 910 identifies themselves to the VRU 912, and decides to make an address change for all future correspondence. The Context Manager 902 initiates a transaction with the transaction service 920 and invokes the update address operation on the Customer object 922, which in turn registers interest in the transaction. Then, the Context Manager 902 invokes the update contact history operation on the Contact object 924, which in turn registers interest in the transaction. Next, the Context Manager 902 tells the transaction service 920 to commit the update address operation, and the transaction service coordinates the updates among the various components.

Figure 10:
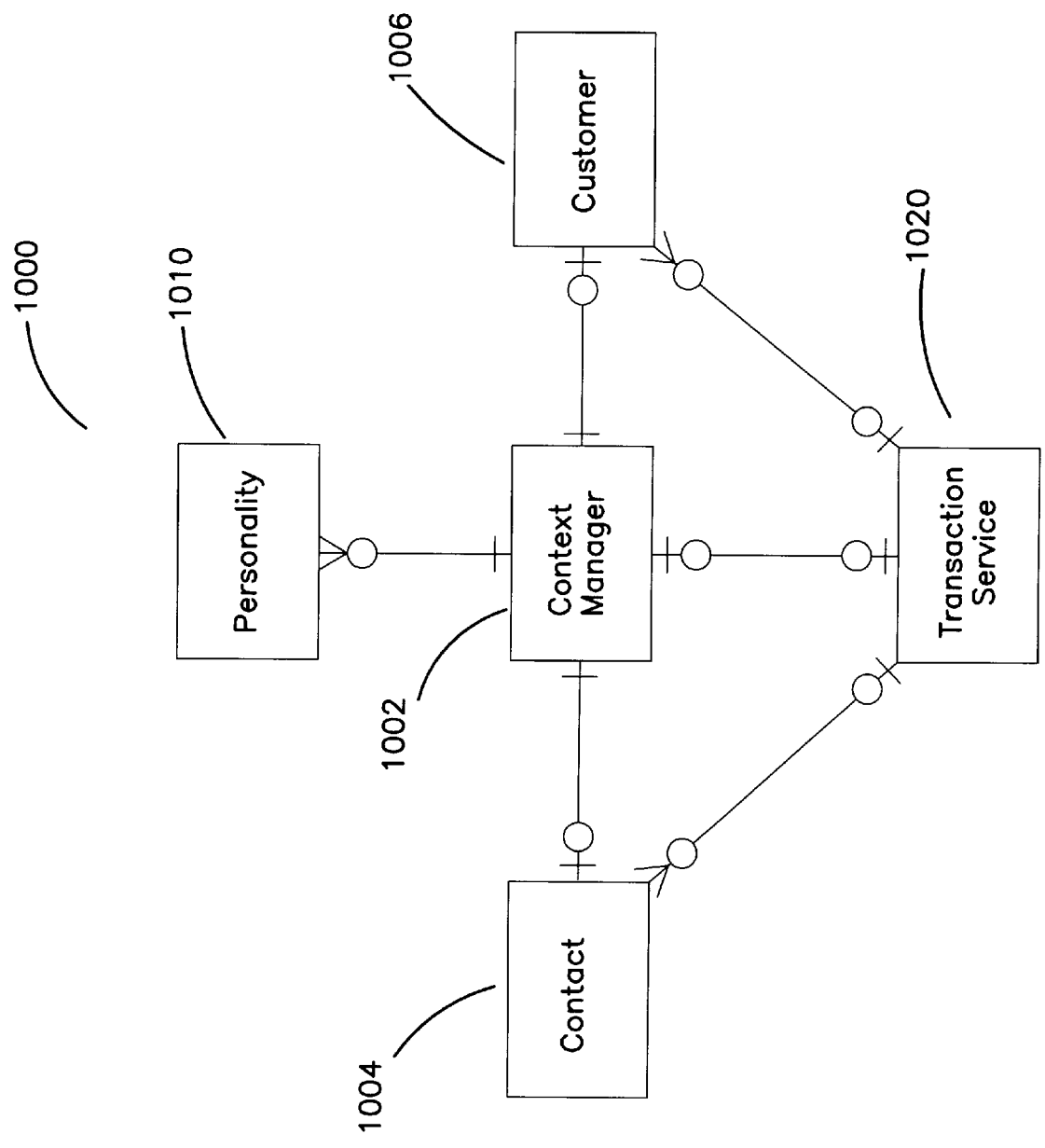
FIG. 10 illustrates an entity relationship model for the Context Manager according to the present invention.

FIG. 10 illustrates an entity relationship model 1000 for the Context Manager 1002 according to the present invention. The Context Manager 1002 keeps track of the contact object 1004 and customer object 1006. Furthermore, the Context Manager 1002 keeps track of contextual or session information, such as the context across customer access resources 1010 and transaction management 1020. The Context Manager 1002 manages the session objects 1002, 1004 for each of the Customer access resources 1010 as well as initiates and coordinates multiple business activities.

Figure 11:
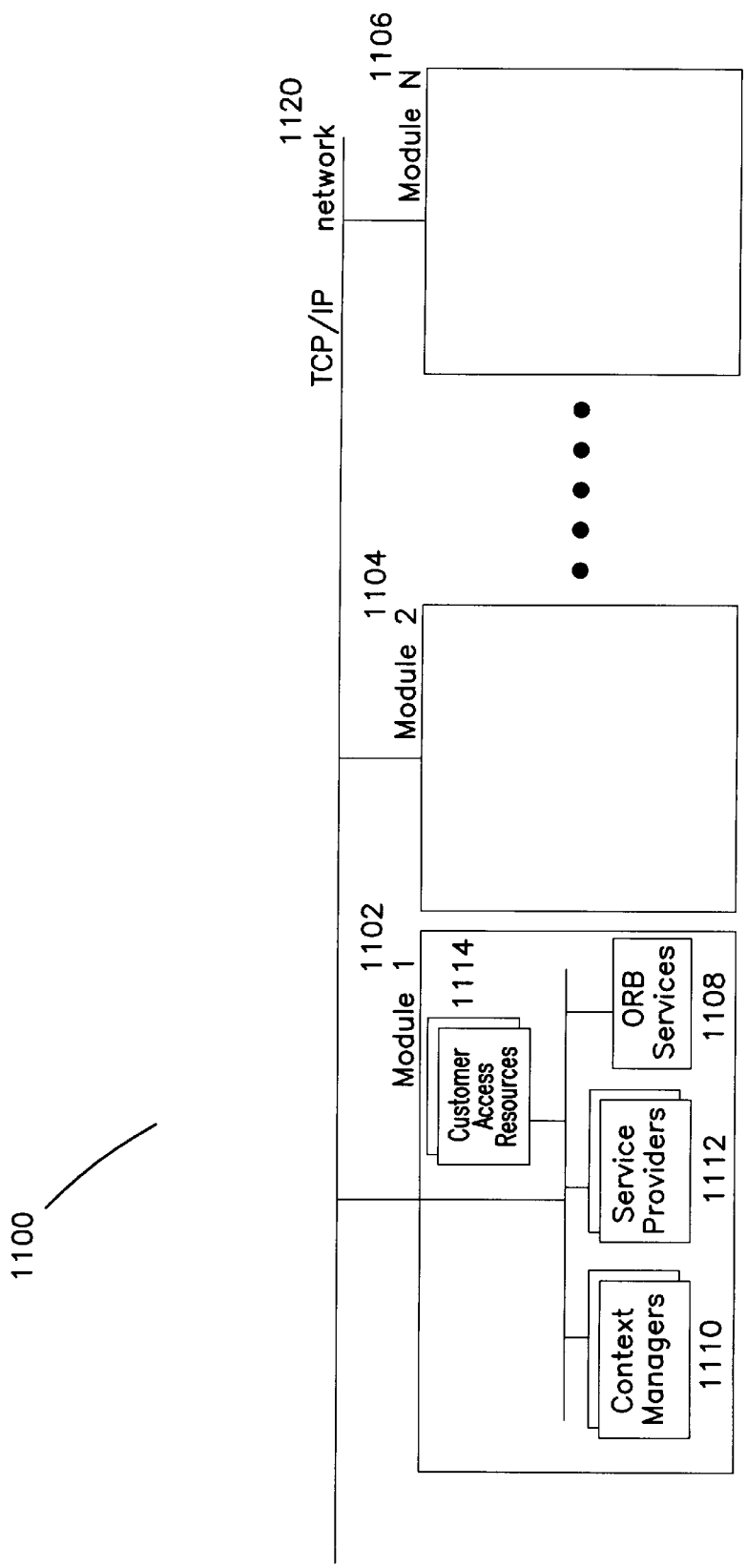
FIG. 11 illustrates the use of modules to achieve massive scalability.

FIG. 11 illustrates the use of modules to achieve massive scalability. Each module uses the services of an object request broker 1108 and all components in the module are registered with the object request broker 1108. Within a module there may be any number of context managers 1110 and supporting service providers 1112. Additionally, customer access resources 1114 may be assigned to a module for administrative purposes. However, any customer access resource can access any context manager in any module. All communications between resources in the module are supported by the underlying TCP/IP network 1120.

By creating modules, the scale of distributed object processing can be controlled to whatever rate is consistent with currently available technology. Should the maximum practical module size be less than that required for the enterprise, it only requires the creation of multiple modules. The creation of multiple modules creates no new distributed object scalability issues. The only issue relates to the sizing of the TCP/IP network 1120 upon which inter-module messages travel. Such a sizing effort is routine and requires no knowledge of distributed object technology or concepts.

In summary, the Context Manager addresses the issue of maximizing the reuse of business processes across those customer access resources by reducing overall implementation cost, improving the time to market and ensuring consistent customer experience across customer access resources. The Context Manager provides a framework that enables continuous customer access resource innovation by maximizing the "openness" of the underlying business processes to create a "plug and play" type of interface. In this way, multiple combinations of users and delivery channels (called Customer access resources) may be created quickly using the best, most current technology and advanced usability characteristics for the specific need. These heterogeneous Customer access resources may then be plugged into the Context Manager to utilize it's ability to leverage the existing, underlying business processes. Accordingly, the Context Manager provides the ability to manage the complexity of multiple Customer access resources which must share common business processes that may be distributed across many underlying, heterogeneous systems.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer implemented context manager for managing multiple customer access resources spanning a large-scale distributed business solution, the context manager comprising:

an object creation means for creating a context manager object for a session, the context manager object provides a bridge from one or more customer access resources to one or more business processes and maintains a context of the session across customer access resources;

a component integration architecture for integrating one or more components into the context manager;

a component interface for presenting the one or more business processes to customer access resources, the customer access resources selecting business processes therefrom; and a transaction management means for preserving object integrity of the session by controlling access to the business activities;

wherein each of the one or more components comprises a reusable software module presenting an interface that conforms to an object model of a context manager object or a business object, the component being enabled and accessed at runtime through the component integration architecture.

2. The context manager of claim 1, wherein the context manager further comprises:

an access coordination means for coordinating access by a customer access resource to a business process; and a business process interface for interfacing the business processes to the customer access resources.

3. The context manager of claim 2, wherein the context manager further comprises:

a context providing means for providing a context for completing the business process for the session; and a managing means for managing information required during the session.

4. The context manager of claim 1 wherein the managing means keeps track of the context manager object, customer objects, account objects, contextual information and session information.

5. The context manager of claim 4 wherein the managing means manages the context manager objects, customer objects, and account objects for each of the customer access resources.

6. The context manager of claim 1 wherein the customer access resources comprise customer service representative applications, Internet/PC applications, and kiosk applications.

7. The context manager of claim 1 wherein the business processes represent high level abstractions of multiple components/objects collaborating to deliver a response to a service request from a particular customer access resource to an appropriate business process.

8. The context manager of claim 1 wherein the component interface relays a selection from the customer access resources to the business components.

9. The context manager of claim 1, wherein the context manager further comprising means for destroying context manager objects as sessions end.

10. The context manager of claim 1 wherein each context manager object maintains sets of relationships to all of the business objects that represent the context for a given session.

11. The context manager of claim 10 wherein the sets of relationships that the context manager maintains during a given session is dependent on the business processes the particular session is using.

12. The context manager of claim 1 wherein the context of a session is shared among customer access resources by sharing context manager objects.

13. The context manager of claim 1 wherein customer access resources can access the same context manager object to perform simultaneous, concurrent functions.

14. The context manager of claim 1, wherein the transaction management means logically groups business activities into a business unit of work, a business unit of work involving a state change to one or more of the business objects that comprise the business activities.

15. The context manager of claim 1 wherein the managing means ensures uniform handling of the business units of work that are defined by the business functions across the customer access resources.

16. A computer implemented context manager for providing a framework to enable continuous customer access resource innovation by maximizing open business processes, the context manager comprising:
 a context manager management interface for creating a context manager object for a session, the context manager object provides a bridge from customer access resources to business processes and maintains a context of the session across customer access resources;
 an access coordinator for coordinating access by a customer access resource to a business process, and wherein the context manager management interface provides a context for completing the business process for the session;
 a component integration architecture for integrating one or more components into the context manager;
 a business process interface for interfacing the business processes to the customer access resources;
 a component interface for presenting business processes to customer access resources, the customer access resources selecting business processes therefrom; and
 a transaction manager for preserving object integrity of the session by controlling access to the business activities;
 wherein each of the one or more components comprises a reusable software module presenting an interface that conforms to an object model of a context manager object or a business object, the component being enabled and accessed at runtime through the component integration architecture.

17. The context manager of claim 16 wherein the context manager management interface further comprises an information manager for managing information required during the session.

18. The context manager of claim 16, wherein
 the context manager further comprising a access coordinator for coordinating access by a customer access resource to a business process; and
 the context manager management interface provides a context for completing the business process for the session.

19. The context manager of claim 16 wherein the context manager management interface keeps track of the contact manager object, customer objects, account objects, contextual information and session information.

20. The context manager of claim 19 wherein the context manager management interface manages the session objects for each of the customer access resources.

21. The context manager of claim 16 wherein the customer access resources comprise customer service representative applications, Internet/PC applications, and kiosk applications.

22. The context manager of claim 16 wherein the business processes represent high level abstractions of multiple components/objects collaborating to deliver the requested response.

23. The context manager of claim 16, wherein the component interface relays a selection from customer access resources to the business components.

24. The context manager of claim 16 wherein the context manager management interface destroys context manager objects when a session ends.

25. The context manager of claim 16 wherein each context manager object maintains sets of relationships to all of the business objects that represent the context for a given session.

26. The context manager of claim 25 wherein the sets of relationships that the context manager maintains during a given session is dependent on the business processes the particular session is using.

27. The context manager of claim 16 wherein the context of a session is shared among customer access resources by sharing context manager objects.

28. The context manager of claim 16 wherein customer access resources can access the same context manager object to perform simultaneous, concurrent functions.

29. The context manager of claim 16, wherein the transaction manager logically groups business activities into a business unit of work, a business unit of work involving a state change to one or more of the business objects that comprise the business activities.

30. The context manager of claim 16 wherein the context manager management interface ensures uniform handling of the business units of work that are defined by the business functions across the customer access resources.

31. A method of providing a framework to enable continuous channel innovation by maximizing open business processes, the method comprising:
 creating a context manager object for a session, the context manager object provides a bridge from one or more customer access resources to one or more business processes and maintains a context of the session across customer access resources;

coordinating access by a customer access resource to a business process;

providing a context for completing the business process for the session;

integrating one or more components into the context manager; and preserving object integrity of the session by controlling access to the business activities;

wherein each of the one or more components comprises a reusable software module presenting an interface that conforms to an object model of a context manager object or a business object, the component being enabled and accessed at runtime through the component integration architecture.

32. The method of claim 31, wherein the method further comprises:

managing information required during the session;

interfacing the business processes to the customer access resources; and presenting the one or more business processes to customer access resources, the customer access resources selecting business processes therefrom.

33. The method of claim 32, wherein the method further comprises:

receiving a first customer request across a first customer access resource;

establishing a first session for the first customer request;

creating a context manager object for the first session, the first session communicating directly with the context manager object; and establishing a relationship between the context manager object and business process objects for satisfying the first customer request.

34. The method of claim 33, wherein the method further comprises switching from the first customer access resource to a second customer access resource during the session by forwarding the reference to the context manager object to the second customer access resource, the context manager object maintaining the context of the session including the context of the service request and the business process objects.

* * * * *

UNITED STATES PATENT AND TRADEMARK OFFICE
CERTIFICATE OF CORRECTION

PATENT NO. : 6,064,973
DATED : May 16, 2000
INVENTOR(S) : Smith et al.

It is certified that error appears in the above-identified patent and that said Letters Patent is hereby corrected as shown below:

Column 2,
Line 64: "are-assignment" should read --re-assignment--

Signed and Sealed this

Twelfth Day of June, 2001

Attest:

NICHOLAS P. GODICI
Attesting Officer
Acting Director of the United States Patent and Trademark Office

UNITED STATES PATENT AND TRADEMARK OFFICE
CERTIFICATE OF CORRECTION

PATENT NO. : 6,064,973
DATED : May 16, 2000
INVENTOR(S) : Smith et al.

Page 1 of 1

It is certified that error appears in the above-identified patent and that said Letters Patent is hereby corrected as shown below:

<u>Column 2,</u>
Line 64: "are-assignment" should read --re-assignment--

Signed and Sealed this

Twenty-fourth Day of July, 2001

*Attest:*

NICHOLAS P. GODICI
*Attesting Officer*  *Acting Director of the United States Patent and Trademark Office*